United States Patent
Kumar et al.

(10) Patent No.: US 11,163,707 B2
(45) Date of Patent: Nov. 2, 2021

(54) VIRTUALIZATION IN HIERARCHICAL CORTICAL EMULATION FRAMEWORKS

(71) Applicant: INTERNATIONAL BUSINESS MACHINES CORPORATION, Armonk, NY (US)

(72) Inventors: Arvind Kumar, Chappaqua, NY (US); Ahmet S. Ozcan, Los Altos, CA (US); J. Campbell Scott, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 864 days.

(21) Appl. No.: 15/959,551

(22) Filed: Apr. 23, 2018

(65) Prior Publication Data
US 2019/0324929 A1    Oct. 24, 2019

(51) Int. Cl.
*G06F 13/16*    (2006.01)
*G06N 3/063*    (2006.01)
(Continued)

(52) U.S. Cl.
CPC .......... *G06F 13/1694* (2013.01); *G06F 9/455* (2013.01); *G06F 12/0238* (2013.01); *G06F 17/10* (2013.01); *G06N 3/063* (2013.01)

(58) Field of Classification Search
CPC .. G06F 12/0238; G06F 13/1694; G06F 17/10; G06F 9/455; G06N 3/008;
(Continued)

(56) References Cited

U.S. PATENT DOCUMENTS

| 5,469,530 A | * | 11/1995 | Makram-Ebeid | G06N 3/063 706/25 |
| 8,521,673 B2 | * | 8/2013 | Todorokihara | G06N 3/10 706/27 |

(Continued)

FOREIGN PATENT DOCUMENTS

EP    3035249 A1    6/2016

OTHER PUBLICATIONS

Young et al.; "An approach to enlarge learning space coverage for robot learning control"; IEEE Transactions on Fuzzy Systems Year: 1997 | vol. 5, Issue: 4 | Journal Article | Publisher: IEEE; Cited by: Papers (11) (Year: 1997).*

(Continued)

*Primary Examiner* — Helen Rossoshek
(74) *Attorney, Agent, or Firm* — Cantor Colburn LLP; Randall Bluestone

(57) ABSTRACT

Embodiments of the present invention describe a hierarchical cortical emulation using a scratchpad memory device and a storage class memory device. The scratchpad memory device is partitioned into a first subset of memory locations and a second subset of memory locations. A processor from a neural network device is assigned a first memory portion from the first subset, a second memory portion from the second subset, and a third memory portion from the storage class memory device. Further the neural network device and a memory controller perform a compute cycle for a hierarchical level k, $1 \leq k \leq n$, n being total number of levels. A compute cycle includes performing, by the processor, computations from the level k using neuron data stored in the first memory portion, and in parallel, copying by the memory controller, the neuron data for a hierarchical level k+1 from the third memory portion to the second memory portion.

17 Claims, 10 Drawing Sheets

(51) Int. Cl.
*G06F 17/10* (2006.01)
*G06F 12/02* (2006.01)
*G06F 9/455* (2018.01)

(58) Field of Classification Search
CPC ........ G06N 3/04; G06N 3/0454; G06N 3/049;
G06N 3/063; G06N 3/084
See application file for complete search history.

(56) References Cited

U.S. PATENT DOCUMENTS

| | | | |
|---|---|---|---|
| 9,064,211 B2* | 6/2015 | Visel | G06F 40/30 |
| 9,256,215 B2 | 2/2016 | Sinyavskiy et al. | |
| 9,311,596 B2 | 4/2016 | Izhikevich et al. | |
| 9,317,429 B2 | 4/2016 | Ramanujan et al. | |
| 9,524,461 B1* | 12/2016 | Huynh | G06N 3/008 |
| 9,563,843 B2* | 2/2017 | Yufik | G06N 3/063 |
| 10,878,313 B2* | 12/2020 | Augustine | G06N 3/049 |
| 10,956,584 B1* | 3/2021 | Heaton | G06F 9/3802 |
| 10,984,054 B2* | 4/2021 | Alsallakh | G06N 3/0454 |
| 2016/0055408 A1 | 2/2016 | Akopyan et al. | |
| 2018/0121120 A1* | 5/2018 | Niu | G06F 3/0604 |
| 2018/0173572 A1* | 6/2018 | Bequet | G06F 16/90344 |
| 2018/0189631 A1* | 7/2018 | Sumbul | G06N 3/063 |
| 2018/0307968 A1* | 10/2018 | Bose | G06N 3/08 |
| 2019/0065935 A1* | 2/2019 | Ozcan | G06N 3/049 |
| 2019/0073127 A1* | 3/2019 | Ravindranath | G06N 3/08 |
| 2019/0187963 A1* | 6/2019 | Bokhari | G06F 9/5038 |
| 2019/0339687 A1* | 11/2019 | Cella | G05B 23/0294 |
| 2019/0340526 A1* | 11/2019 | Turner | G06N 3/105 |
| 2019/0361811 A1* | 11/2019 | Saeki | G06F 12/0862 |
| 2020/0348662 A1* | 11/2020 | Cella | G05B 23/0229 |
| 2020/0394495 A1* | 12/2020 | Moudgill | G06N 3/0481 |
| 2021/0012182 A1* | 1/2021 | Florez Choque | G06N 7/005 |

OTHER PUBLICATIONS

Lloyd et.al., "Evaluating the Feasibility of Storage Class Memory as Main Memory," MEMSYS 2016, The International Symposium on Memory System, LLNL-CONF-687015, Mar. 29, 2016, pp. 1-7.

Rodriguez et al., "Volatile STT-RAM Scratchpad Design and Data Allocation for Low Energy," ACM Transactions on Architecture and Code Optimization (TACO) TACO vol. 11, 2014, pp. 1-20.

Zaveri, Mazad S., and Dan Hammerstrom. "Performance/price estimates for cortex-scale hardware: a design space exploration." Neural Networks 24.3 (2011): 291-304.

* cited by examiner

VIRTUALIZATION IN HIERARCHICAL CORTICAL EMULATION FRAMEWORKS

BACKGROUND

The present invention generally relates to neuromorphic and synaptronic computation, and in particular to virtualization in a hierarchical cortical system.

Neuromorphic and synaptronic computation systems, also referred to as artificial neural networks, are computational systems that permit electronic systems to function in a manner analogous to that of biological brains. Neuromorphic and synaptronic computation systems do not generally utilize the traditional digital model of manipulating 0s and 1s. Instead, neuromorphic and synaptronic computation systems create connections between processing elements that are functionally equivalent to neurons of a biological brain. Neuromorphic and synaptronic computation systems include various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of individual experiences is stored in conductance of the synapses.

Hierarchical Temporal Memory (HTM) is one example of a model of a cortical system used for implementing machine intelligence. In a HTM network, training data comprising temporal sequences of patterns are presented to a network of nodes. Typically, the HTM network then builds a model of the statistical structure inherent to the patterns and sequences in the training data, and thereby learns the underlying 'causes' of the temporal sequences of patterns and sequences in the training data. The hierarchical structures of the HTM network facilitates building models of very high dimensional input spaces.

SUMMARY

According to one or more embodiments of the present invention a hierarchical cortical emulation system includes a neural network device having a plurality of processors. The hierarchical cortical emulation system further includes a memory controller communicatively coupled with the neural network device. The hierarchical cortical emulation system further includes a scratchpad memory device communicatively coupled to the memory controller. The hierarchical cortical emulation system further includes a storage class memory device communicatively coupled to the memory controller. The scratchpad memory device is partitioned into a first subset of memory locations and a second subset of memory locations. A processor from the neural network device is assigned a first memory portion from the first subset of memory locations, a second memory portion from the second subset of memory locations, and a third memory portion from the storage class memory device. The neural network device and the memory controller perform a compute cycle for a hierarchical level k from the hierarchical cortical emulation that contains n levels, $1 \le k \le n$. The compute cycle includes performing, by the processor, computations for a neuron from the level k using neuron data for the hierarchical level k stored in the first memory portion, and, in parallel, copying by the memory controller, the neuron data for a hierarchical level k+1 from the third memory portion to the second memory portion.

According to one or more embodiments of the present invention a computer-implemented method includes partitioning, by a memory controller, a scratchpad memory device into a first subset of memory locations and a second subset of memory locations. The method further includes assigning, by a controller, a processor, from multiple processors of a neural network device, a first memory portion from the first subset of memory locations, a second memory portion from the second subset of memory locations, and a third memory portion from a storage class memory device. The method further includes performing, by the neural network device and the memory controller, a compute cycle k for a hierarchical level k from a hierarchical cortical emulation that contains n levels, $1 \le k \le n$. The compute cycle k includes performing, by the processor, computations for a neuron from the hierarchical level k using neuron data for the hierarchical level k stored in the first memory portion, and, in parallel, copying by the memory controller, the neuron data for a hierarchical level k+1 from the third memory portion to the second memory portion.

According to one or more embodiments of the present invention a computer program product has a computer readable storage medium having program instructions embodied therewith, the program instructions being executable by a processing circuit to cause the processing circuit to perform a hierarchical cortical emulation. The hierarchical cortical emulation includes partitioning a scratchpad memory device into a first subset of memory locations and a second subset of memory locations. The hierarchical cortical emulation further includes assigning a processor, from multiple processors of a neural network device, a first memory portion from the first subset of memory locations, a second memory portion from the second subset of memory locations, and a third memory portion from a storage class memory device. The hierarchical cortical emulation further includes performing, by the neural network device and a memory controller, a compute cycle k for a hierarchical level k from a hierarchical cortical emulation that contains n levels, $1 \le k \le n$. The compute cycle k includes performing, by the processor, computations for a neuron from the hierarchical level k using neuron data for the hierarchical level k stored in the first memory portion, and, in parallel, copying by the memory controller, the neuron data for a hierarchical level k+1 from the third memory portion to the second memory portion.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

Figure 1:
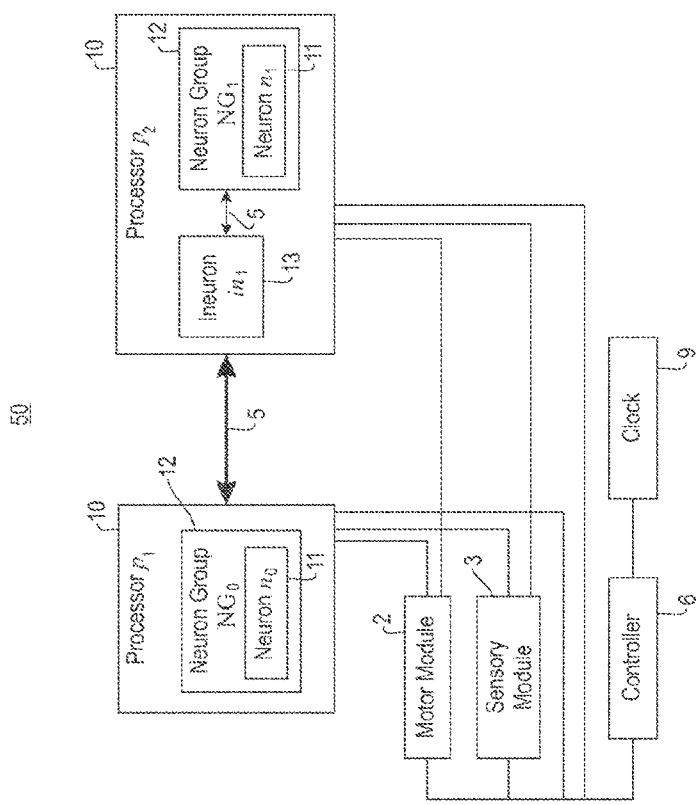
FIG. 1 is a block diagram illustrating a cortical emulation framework according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Described herein are embodiments of the present invention for memory and processor virtualization in a hierarchical cortical system.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Scaling up brain-inspired cortical computing systems to levels where they can solve sophisticated cognitive problems present various technical challenges. One of the technical challenges relates to the number of neurons in cortical systems. The total number of neurons in the human brain is very large, studies suggest it is greater than 10 billion. Each neuron is like a small distributed computing element; replicating so many elements in a VLSI system demands very high form factor and power. Another technical challenge is the interconnectivity. Each of the neurons in biological systems are able to connect to 1000-10000 other neurons at junctions called synapses. A neuron can in principle connect to any other neuron. This is much higher than the connectivity of VLSI systems. Further, a technical challenge implementing electronic versions of biological systems includes representing in electronic components the plasticity of biological connections. As learning proceeds, new synapses are plastically formed and removed. Dynamically creating and destroying physical connections in a VLSI system is not practical. This capability is important for scaling up to large systems for machine intelligence.

A technical solution to address the technical challenges is to store the connections for each neuron in memory, allowing them to change dynamically as learning proceeds. However, for a human-brain scale system (~$10^{11}$ neurons, $10^{15}$ synapses) the storage requirements become dauntingly large (10-100 TB). The very high density of Storage Class Memory (SCM) can be used for high storage. The SCM devices have a higher density (~10×) compared to DRAM devices. Further, SCM devices have non-volatility, resulting in lower power consumption. However, SCM devices have latency and limited endurance that are substantial obstacles for implementing a cortical system using SCM devices.

Embodiments of the present invention facilitate using SCM devices in a cortical system while mitigating the technical challenges with the SCM devices. For example, SCM devices used in the one or more embodiments of the present invention include Non-Volatile Dual Inline Memory Module (NVDIMM), 3DXP, or any other types of SCM devices. Embodiments of the present invention therefore facilitate much greater storage than possible with conventional DRAM. Further, according to one or more embodiments of the present invention, SCM devices can be used for resource virtualization, substantially reducing the number of resources, such as processors and memory devices, required in a hierarchical cortical system. Embodiments of the present invention use SCM devices combined with a low-latency scratchpad such as DRAM devices to address the technical challenges described herein. The high density of SCM devices enables the storage of many more connections than possible using a main memory (low latency) technology such as DRAM. Because the brain processes information in a hierarchical sequence, embodiments of the present invention facilitate using same processing units to be re-used at different levels in the hierarchy, because the relevant data for the level of hierarchy being processed are in a local memory scratchpad and quickly accessible by the processor. Accordingly, the number of processing units in the cortical system can be greatly reduced—i.e., processing can be virtualized.

Cortical emulation is an essential component in computational neuroscience. A cortical or neural network system can be implemented using a computer system including multiple processors. Each processor can have rapid access to a block of main memory assigned to said processor. Each processor is configured to compute the entire state of one or more neurons. Information pertaining to the one or more neurons is stored on the block of main memory block assigned to said processor, thereby enabling rapid access to said information.

FIG. 1 is a block diagram illustrating a cortical emulation framework 50, according to one or more embodiments of the present invention. The framework 50 includes a plurality of processors 10, such as processors p1 and p2. Each processor 10 includes one or more neuron groups 12, wherein each neuron group 12 includes at least one neuron 11. For example, as shown in FIG. 1, the processor p1 includes a neuron n0 in a neuron group NG0, and the processor p2 includes a neuron n1 in a neuron group NG1.

As described in detail later herein, the framework 50 allows for bidirectional delivery of information (e.g., spikes, aggregated synaptic weights) between neurons 11 on different processors 10. Specifically, the framework 50 further includes multiple reciprocal communication pathways 5 and at least one Ineuron module 13. The reciprocal communication pathways 5 provide inter-processor connectivity as well as intra-processor connectivity. Each Ineuron module 13 is an efficient scalable communication infrastructure that facilitates bidirectional delivery of information (e.g., spikes) between a pair of processors 10.

As shown in FIG. 1, each neuron group 12 can also be connected to external spiking systems such as motor modules 2 and sensory modules 3. A motor module 2 represents a motor control system configured to provide motor output. A sensory module 3 represents a sensory transducer configured to provide sensory input.

Also shown in FIG. 1, the framework 50 further includes a control module ("controller") 6 that is connected to a clock 9. The clock 9 produces clock signals used by the controller 6 to generate time-steps. The controller 6 divides each time-step into operational phases in the framework 50 for neuron updates, etc. In one or more embodiments of the invention, each processor 10 has its own controller 6 and clock 9.

Figure 2:
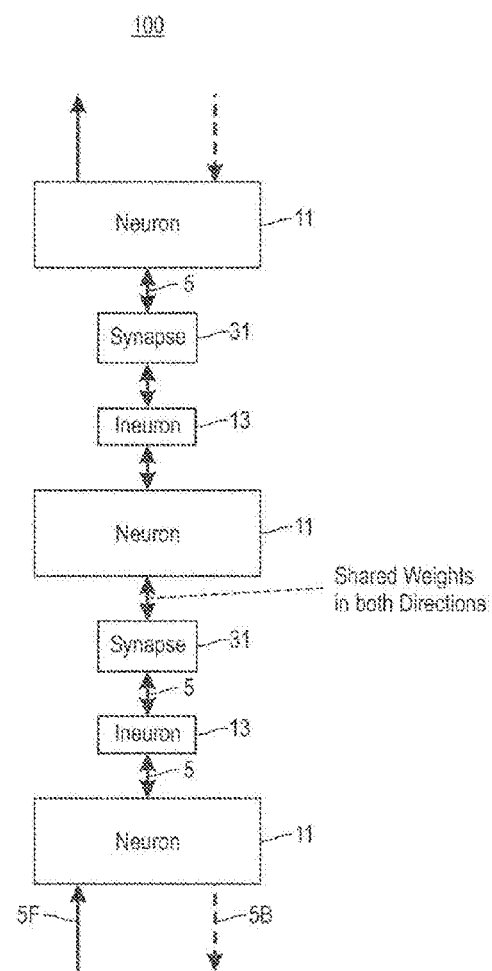
FIG. 2 is a block diagram illustrating a neural network with reciprocal connectivity between neurons in accordance with embodiments of the invention.

FIG. 2 is a block diagram illustrating a neural network 100 with reciprocal connectivity between neurons 11, in accordance with an embodiment of the invention. The neural network 100 includes multiple neurons 11, multiple synapses 31, and multiple reciprocal communication pathways 5.

The neural network 100 further includes multiple Ineuron modules 13 that facilitate bidirectional communication between the neurons 11. Each reciprocal communication pathway 5 can be classified one of the following: a forward communication pathway 5F, or a backward communication pathway 5B. Information (e.g., spikes) propagates between the neurons 11 in a first direction ("forward direction") via forward communication pathways 5F. Information also propagates between the neurons 11 in a second direction opposite of the forward direction ("backward direction") via backward communication pathways 5B.

A source neuron 11 is a neuron 11 that generates a spike. A target neuron 11 is a neuron 11 that receives a spike from a source neuron 11. For each source neuron 11, spikes generated by said source neuron 11 are delivered to a corresponding Ineuron module 13 in the forward direction. Each Ineuron module 13 has a corresponding synapse 31 having a synaptic weight. Each Ineuron module 13 distributes the spikes received from a source neuron 11 to a target neuron 11 in the forward direction. Each spike distributed by each Ineuron module 13 in the forward direction is assigned a synaptic weight that equals the synaptic weight of a synapse 31 corresponding to said Ineuron module 13. Each synapse 31 is reconfigurable for learning rules such as Hebbian, anti-Hebbian, spike-timing-dependent-plasticity (STDP), or anti-STDP.

In response to the spikes received from a source neuron 11, a target neuron 11 can generate a spike when its membrane potential reaches a spiking threshold. The target neuron 11 delivers the spikes generated to the source neuron 11 in the backward direction. Each spike generated by a target neuron 11 is assigned the same synaptic weight as the synaptic weight assigned to spikes received by the target neuron 11. As such, the synaptic weight of a synapse 31 interconnecting two neurons 11 is shared between the two neurons 11 in both the forward direction and the backward direction.

The cortical framework 50 can be used to implement a simulated biological cortical system, such as to implement functions like visual recognition, speech analysis, and the like, in a manner in which biological brains perform the operations, using hierarchical models implemented by the neural network 100 with a layered topology. For example, studies of biological brain operations, such as that of the visual system have found that for these operations, in the biological neural networks, the receptive fields of units (i.e., the region of the visual space that units respond to) at one level of the hierarchy are constructed by combining inputs from units at a lower level. After a few processing stages, small receptive fields tuned to simple stimuli get combined to form larger receptive fields tuned to more complex stimuli. Such anatomical and functional hierarchical architecture is a hallmark of the organization of the visual system, and other operational subsystems of biological brains.

In embodiments of the present invention, learning causes and associating novel input with learned causes are achieved using what may be referred to as a "hierarchical temporal memory" (HTM). An HTM is a hierarchical network of interconnected nodes that individually and collectively (i) learn, over space and time, one or more causes of sensed input data and (ii) determine, dependent on learned causes, likely causes of novel sensed input data. HTMs, in accordance with one or more embodiments of the present invention, are further described.

Figure 3A:
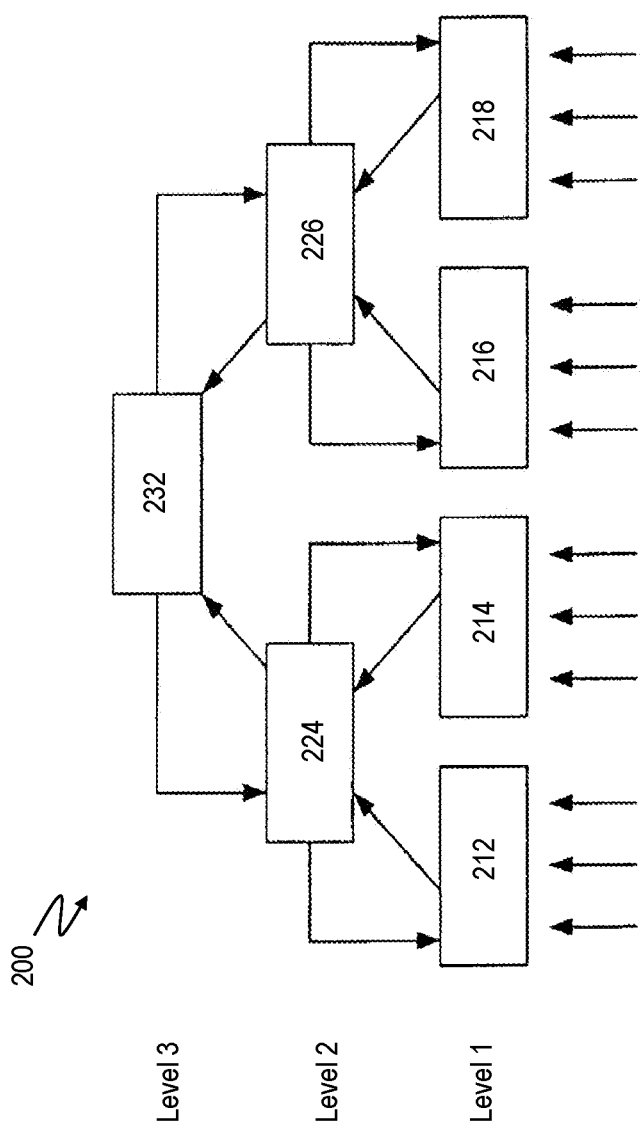
FIG. 3A depicts an example HTM according to one or more embodiments of the present invention.

FIG. 3A depicts an example HTM according to one or more embodiments of the present invention. An HTM 200 has several levels of nodes. The illustrated HTM 200 has three levels L1, L2, L3, with level L1 being the lowest level, level L3 being the highest level, and level L2 being between levels L1 and L3. Level L1 has nodes 212, 214, 216, and 218; level L2 has nodes 224, 226; and level L3 has node 232. The nodes 212, 214, 216, 218, 224, 226, and 232 are hierarchically connected in a tree-like structure such that each node may have several children nodes (i.e., nodes connected at a lower level) and one parent node (i.e., node connected at a higher level). Each node 212, 214, 216, 218, 224, 226, and 232 may have or be associated with a capacity to store and process information. For example, each node 212, 214, 216, 218, 224, 226, and 232 may store sensed input data (e.g., sequences of patterns) associated with particular causes. Further, each node 212, 214, 216, 218, 224, 226, and 232 may be arranged to (i) propagate information "forward" (i.e., "up" an HTM hierarchy) to any connected parent node and/or (ii) propagate information "back" (i.e., "down an HTM hierarchy) to any connected children nodes.

Inputs to the HTM 200 from a sensory system, are supplied to the level L1 nodes 212, 214, 216, and 218. A sensory system through which sensed input data is supplied to level L1 nodes 212, 214, 216, and 218 may relate to typical human senses (e.g., touch, sight, sound) or other human or non-human senses. An input can be received, for example, as a data file, or any other electronic data that is computer readable, such as an image file, or any other data type. A data file can be any set or collection of data.

While HTM 200 is shown as having three levels, an HTM in accordance with one or more embodiments of the present invention may have any number of levels. Moreover, the hierarchical structure of an HTM may be different than that shown. For example, an HTM may be structured such that one or more parent nodes have three children nodes as opposed to two children nodes like that shown. Further, in one or more embodiments of the present invention, an HTM may be structured such that a parent node in one level of the HTM has a different number of children nodes than a parent node in the same or another level of the HTM. Further, in one or more embodiments of the present invention, an HTM may be structured such that a parent node receives input from children nodes in multiple levels of the HTM. In general, those skilled in the art will note that there are various and numerous ways to structure an HTM other than as shown in FIG. 3A.

Typically, the HTM 200 discovers one or more causes in its world from sensory input data received by the HTM. In other words, an HTM does not necessarily have a sense particular to each of the types of causes being sensed; instead, an HTM may discover from raw sensed input data that causes such as cars and words exist. In such a manner, an HTM is able to learn and form representations of causes existing in its world.

While embodiments of the present invention are independent of how an HTM is implemented/structured, an example is described herein to aid in the description. Typically, an "object" being learned by the HTM 200 has persistent structure. The persistent structure causes persistent patterns to be sensed by an HTM. Each sensed input pattern has a spatial attribute. In other words, each sensed input pattern may be thought of as being represented as a particular set of bits. In general, a node in an HTM "learns," i.e., stores and associates with a common cause, sensed input patterns by determining "coincidences" of sensed input patterns in its input. Determining coincidences of sensed input patterns involves determining which sensed input patterns are active at the same time at a rate statistically greater than what would be expected based on mere chance. For example, if an HTM node having one hundred inputs has seven inputs that become active together at some statistically significant rate, then the HTM node learns the sensed input patterns at those seven inputs.

In addition to an HTM node learning commonly occurring sensed input patterns as described above, the HTM node learns common sequences of those learned sensed input patterns. A particular sequence of learned sensed input patterns may be learned by recognizing that the sequence occurs at a rate statistically greater than what would be expected based on mere chance. For example, if of fifty sensed input patterns learned by an HTM node, three occur in a particular order at some statistically significant rate, then the HTM node may learn that sequence of sensed input patterns.

In the HTM 200, the sequences learned by an HTM node may each be represented by a variable. As each learned sequence is associated with a particular cause, each variable accordingly represents a different cause. The HTM node may pass each of its variables up to a parent node via a vector containing probabilities as to the likelihood that each of its learned sequences is active at its input at a given time. The parent node may then (i) determine coincidences of its sensed input patterns (i.e., the variables received from its child node), (ii) learn sensed input patterns as described above, and (iii) learn sequences of learned sensed input patterns (i.e., learn sequences of variables representing sequences learned by its child node).

Figure 3B:
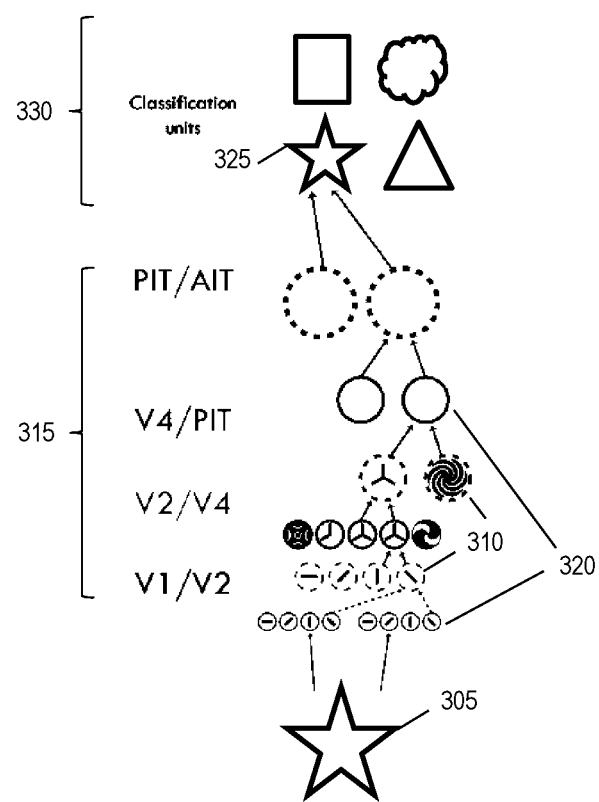
FIG. 3B depicts a representation of a hierarchical model of visual processing example scenario.

FIG. 3B depicts a representation of a hierarchical model of visual processing example scenario. The example scenario depicts visual processing by a brain to identify an input shape 305. In the representation, different hierarchical levels 315, such as V1, V2 and V4 correspond to primary, second and fourth visual areas, PIT and AIT to posterior and anterior inferotemporal areas (or regions), respectively of the brain. The visual processing model depicted in FIG. 3B uses two types of computations: a max-like operation 310 (shown in dash circles) over similar features at different position and scale to gradually build tolerance to position and scale and a bell-shaped tuning operation 320 (shown in plain circle) over multiple features to increase the complexity of the underlying representation. Each hierarchical level 315 combines stimuli that is received to construct a more complex stimuli that is forwarded to a next hierarchical level 315, until an nth level classifies the combined stimuli into an output (recognized) shape 325 from a set of known predetermined shapes 330.

It is understood that the depicted illustration is exemplary, and that in one or more embodiments of the present invention the model can include a different number of hierarchical levels 315 than those shown. It is also understood that in other embodiments of the present invention, different operations are used for the visual processing, and further a different model can be used for the visual processing. Further, it is understood that in other embodiments of the present invention different operations of the brain, such as speech processing, motor functions, or any other such operations can be performed and that the visual processing depicted herein is just exemplary.

Figure 4:
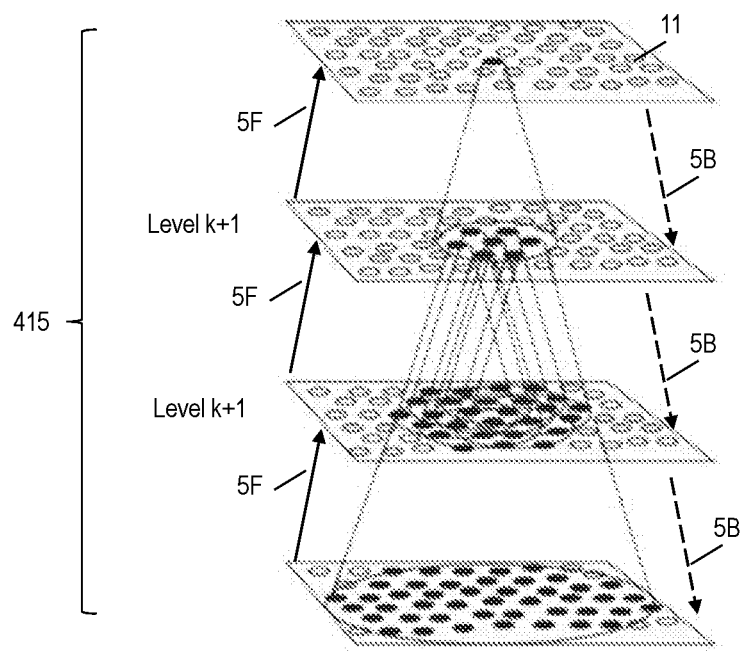
FIG. 4 depicts mapping the hierarchical model of visual processing to a digital cortical system according to one or more embodiments of the present invention.

FIG. 4 depicts mapping the hierarchical model of visual processing to a digital cortical system according to one or more embodiments of the present invention. The visual processing, or any other operation of the brain, is mapped to the digital cortical system by implementing the neural network 100 that includes the multiple hierarchical levels 315. Each hierarchical level 315 from the brain is mapped to a respective collection of neurons 415, each collection including multiple neurons 11. The hierarchical models of the visual system are characterized by multiple levels of processing whereby neurons 11 in one level 415 (i.e. hierarchical level), say level k+1, pool the response of neurons 11 from the previous level 415, level k. Individual level 415 contain multiple feature maps, which can be organized according to spatial location and/or scale. A hypercolumn can contains all possible features from all feature maps for that location. Hence each level 415 can be thought of as containing hypercolumns replicated at all positions and scales. A neuron 11 from a level k is interconnected with one or more other neurons 11 from that level k itself, as well as with one or more neurons 11 from level k+1 via forward path(s) 5F. Further, a neuron 11 from the level k+1 is connected with one or more neurons 11 from the previous level k via backward path(s) 5B.

As can be seen, implementing a hierarchical cortical system requires a large number of neurons 11 for each level 415, and as the number of levels 415 increases, the number of neurons 11 also increases. The resources required to implement the neurons 11 and corresponding synapses, weight storage elements, and other such computational resources, thus limit the implementation of the hierarchical cortical system. The embodiments of the present invention address such technical challenges and improve the implementation of the hierarchical cortical system by facilitating virtualization of the computational resources using a combination of SCM devices and scratchpad memory devices. The embodiments of the present invention accordingly address a technical challenge in, and/or provide an improvement to a technical solution to a technical challenge that is rooted in computing technology, particularly implementing a hierarchical cortical system.

Figure 5:
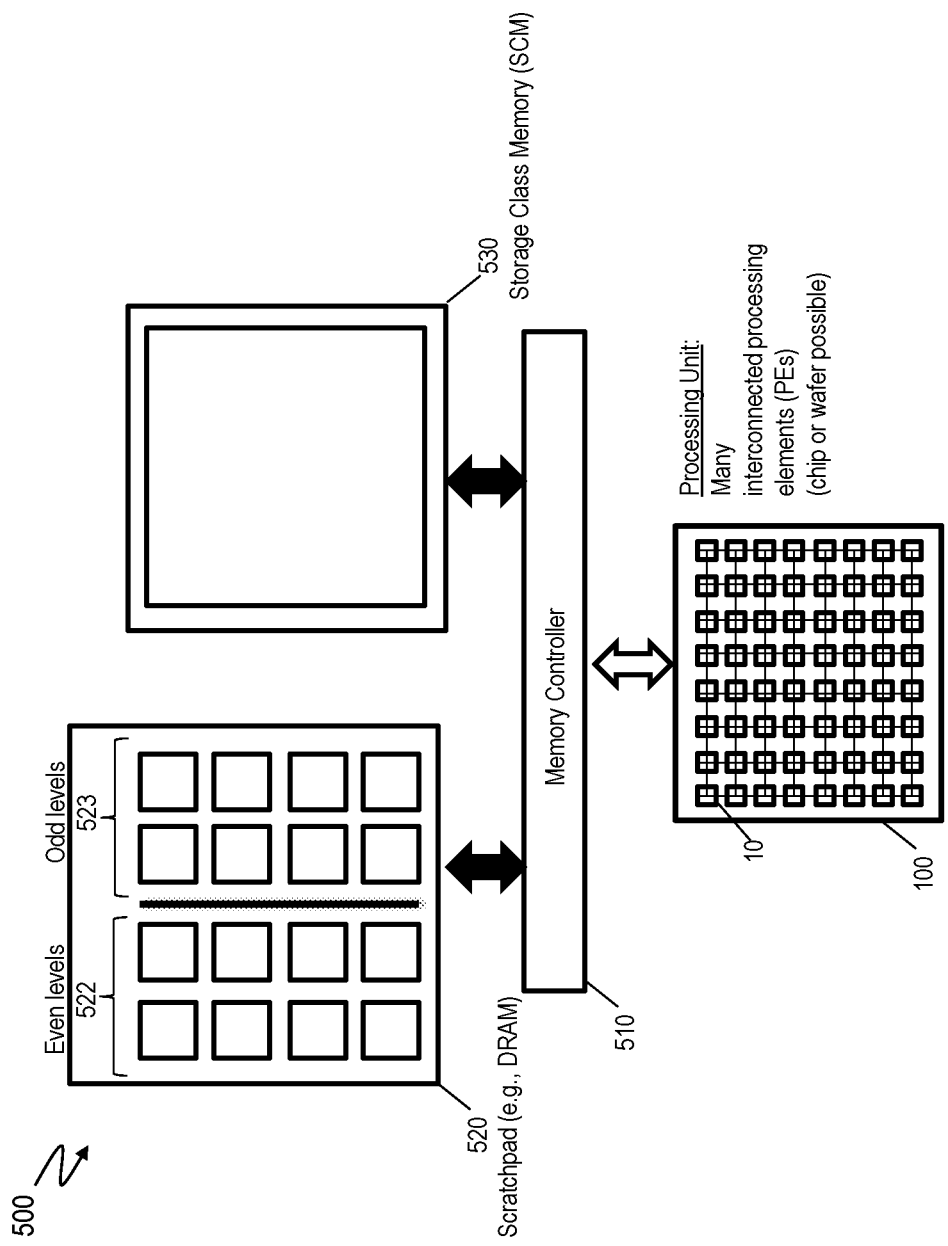
FIG. 5 depicts a block diagram of a hierarchical cortical system according to one or more embodiments of the present invention.

FIG. 5 depicts a block diagram of a hierarchical cortical system according to one or more embodiments of the present invention. As depicted, a hierarchical cortical system 500 includes a neural network 100 that includes multiple processors 10 that can be used to implement the neurons 11. The neural network 100 can be a chip or wafer, or any other implementation of a neural network that includes two or more interconnected processors 10 that operate as neurons of the neural network 100. The hierarchical cortical system 500 further includes a scratchpad memory device 520 and a storage class memory (SCM) device 530 coupled with the neural network 100 via a memory controller 510. As noted earlier, the SCM device 530 has a first latency (time to access memory) that is (substantially) larger than a second latency of the scratchpad memory device 520. In one or more examples, the SCM device 530 is a NVDIMM type memory device, and the scratchpad memory device 520 is a DRAM type memory device. It is understood that in other embodiments of the present invention, the memory devices can be of different type(s).

The scratchpad memory device 520 is divided into multiple portions, with a first subset of portions 522 assigned to even numbered levels in the cortical system 500, and a second subset of portions 523 assigned to odd numbered levels. The portions can all be of the same size (capacity) or different sizes, the sizes being predetermined sizes.

Figure 6:
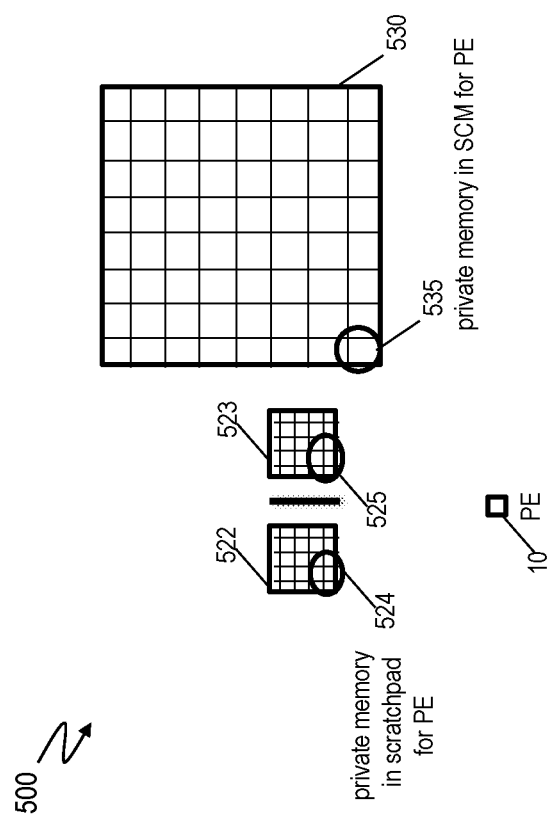
FIG. 6 depicts a block diagram of a portion of a hierarchical cortical system according to one or more embodiments of the present invention.

FIG. 6 depicts a block diagram of a portion of the hierarchical cortical system 500 according to one or more embodiments of the present invention. As depicted, each processor 10 has a first assigned portion 524 of private memory in the first subset of portions 522 (even partition) and a second assigned portion 525 of private memory in the second subset of portions 523 (odd partition) in the scratchpad memory device 520. Further, the processor 10 has a third assigned portion 535 of private memory in the SCM device 530. The third assigned portion 535 on the SCM device 530 contains all the connections that the processor 10 uses (when operating as a neuron 11 from different levels 415), while the first and/or second assigned portions 524/525 on the scratchpad memory device 520 contain only the connections for the current level k that the processor 10 is processing and the next level k+1 that the processor 10 will process in the next compute cycle.

Figure 7:
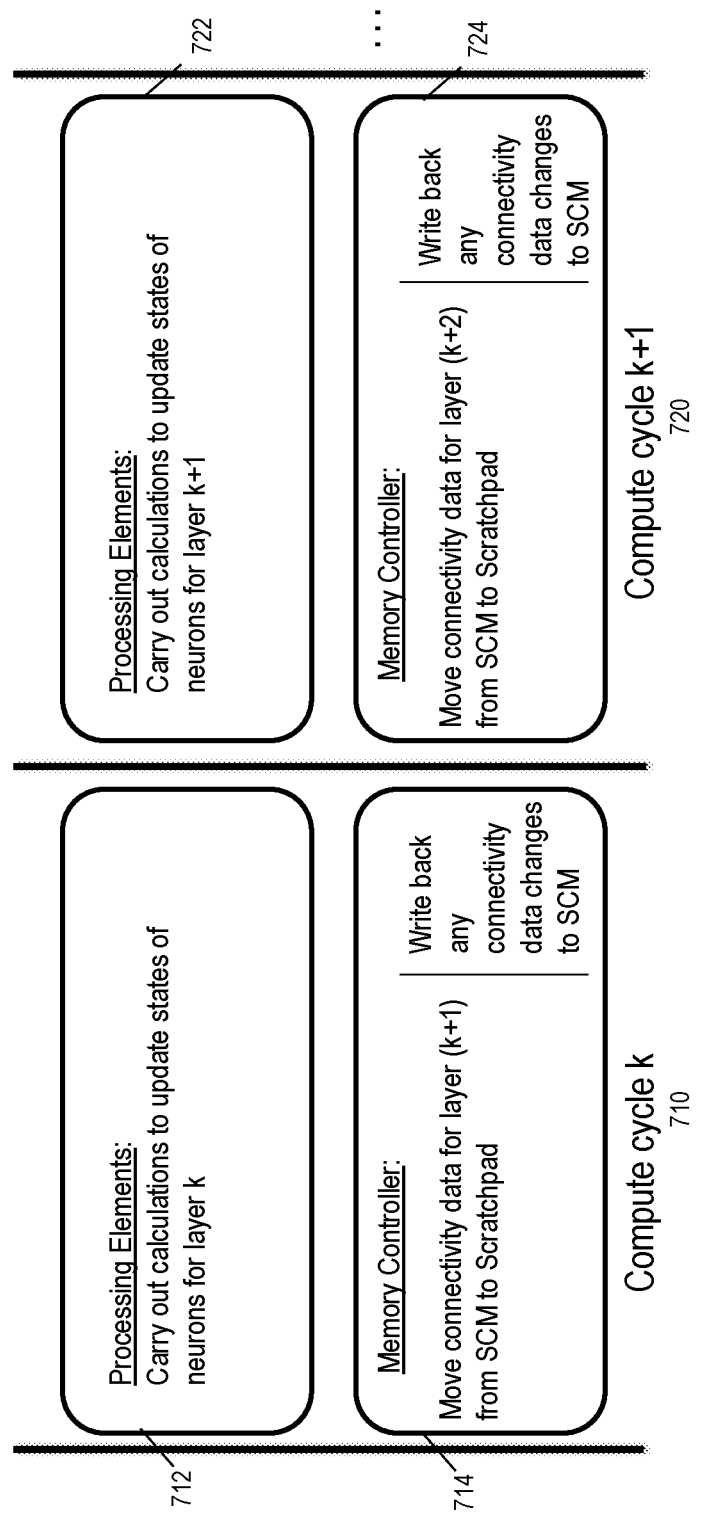
FIG. 7 depicts a block diagram of a compute cycle of a hierarchical cortical system according to one or more embodiments of the present invention.

FIG. 7 depicts a block diagram of a compute cycle of the hierarchical cortical system according to one or more embodiments of the present invention. During each compute cycle 710, the hierarchical cortical system 500 performs operations of a hierarchical level 415. For example, during a compute cycle k 710, the hierarchical cortical system 500 performs operations of the level k.

The operations for the level k include performing the calculations to update states of the neurons 11 for the layer k by the processors 10, at 712. These calculations can include forward pass, backward pass, and/or weight update, or any other computations for the neurons 11 of the level k. In case of HTM implementation, the calculations can include a permanence update for the neurons 11. Based on these computations, the connections of the neurons 11 of the level k are updated. Alternatively, or in addition, the computations can cause the weights of the neurons 11 of the level k to be updated.

In parallel, while the processors 10 perform the computations to update the neurons 11 of level k, the compute cycle k 710 also includes, copying (or moving) by the memory controller 510, connectivity data for layer (k+1) from the SCM device 520 to the scratchpad memory device 520, at 714. The copying includes selecting, from the third assigned portion 535 of a processor 10, the connection data corresponding to the neuron 11 from level (k+1) that is executed by the processor 10. The selected connections for the level (k+1) are copied to the first assigned portion 524 if (k+1) is even, and to the second assigned portion 525 if (k+1) is odd. The connection data can include forward and backward communication paths for the neuron 11.

Further, the compute cycle k 710 includes writing back any connectivity data changes caused by the computations by the processors 10 to the SCM device 530. The memory controller 510 writes back the changes for a processor 10 into the third assigned portion 535 for the processor 10.

Similarly, for a compute cycle (k+1) 720, the hierarchical cortical system 500 performs the neuron update communications for the level (k+1) using the processors 10, at 722. Further, during the compute cycle (k+1) 720, the hierarchical cortical system 500 copies connectivity data for level (k+2) from the SCM device 530 to the scratchpad memory device 520, at 724. Further yet, after completion of the computations by the processors 10, the updates to the neurons 11 of the level (k+2) are written back to the SCM device 530.

Accordingly, at each compute cycle, connection data for the current level is already loaded from the SCM device 530 to the scratchpad memory device 520 and used by the processors 10 to execute the neurons 11 of the current level. While the processors 10 are computing and executing the neurons 11 of the current level, in parallel the connection data for the next level is moved from the SCM device 530 into the designated areas of the scratchpad memory device 520 by the memory controller 510.

The hierarchical cortical system 500, by executing the computations by the processors 10 in parallel with the data transfer from the SCM device 530 to the scratchpad memory device 520, hides the higher read latency of the SCM device 530 by the compute cycle of the processors 10. Further, once the computation cycle of the current level is completed, the same set of processors 10 begin processing on the next level in the hierarchy, thus facilitating virtualization of the resources for multiple levels.

Further, any changes in connectivity found during the current compute cycle are updated in the SCM device 530 without high latency because of the sparsity principle. According to the sparsity principle only the active neurons (typically 1-2% of all neurons) are updated, and hence, the number of writes to the SCM device 530 are small, mitigating any endurance issues with the SCM device 530.

Figure 8:
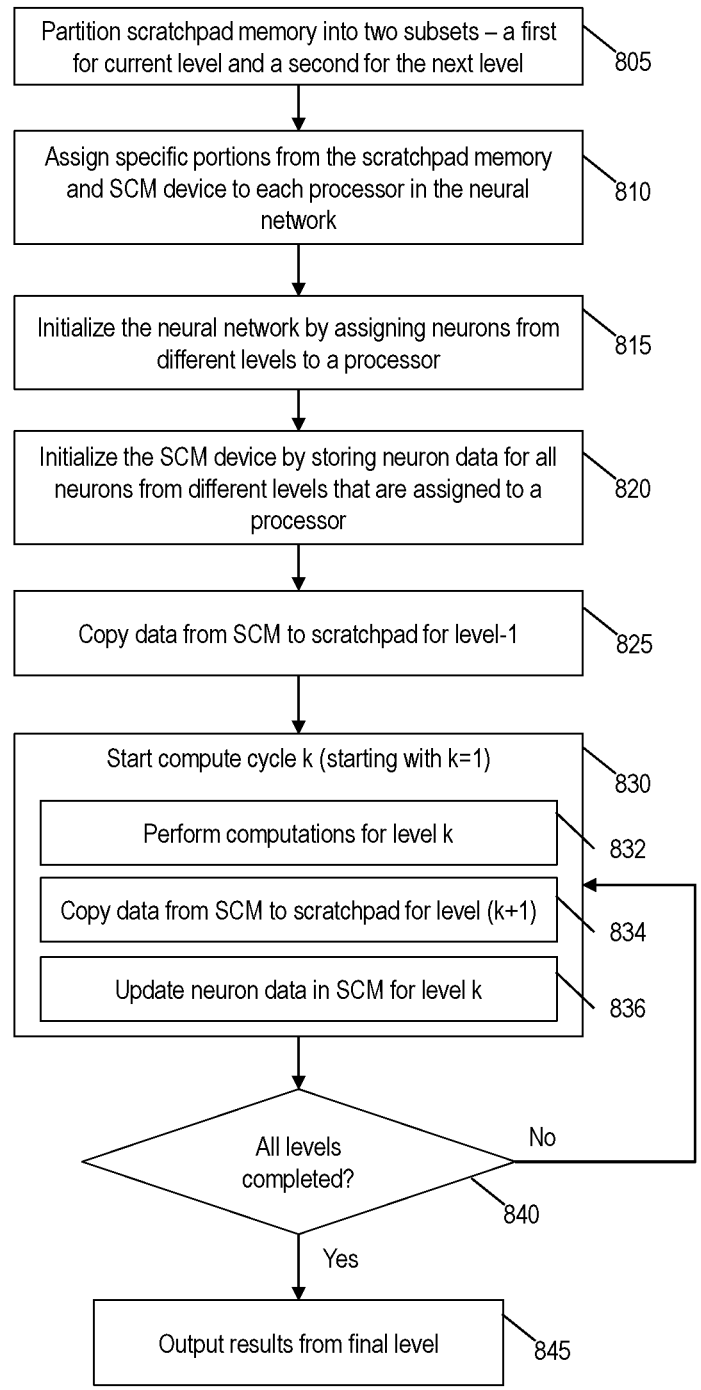
FIG. 8 depicts a flowchart of a method for virtualizing resources for the operation of the hierarchical cortical system according to one or more embodiments of the present invention.

FIG. 8 depicts a flowchart of a method for virtualizing resources for the operation of the hierarchical cortical system according to one or more embodiments of the present invention. The method includes partitioning the scratchpad memory device 520 into two sections, one for the current level of the hierarchy and one for the next level, at 805. In one or more examples, the partitioning divides the scratchpad memory device 520 among the first subset 522 for even numbered levels and the second subset 523 for off numbered levels. The method further includes assigning each processor 10 in the neural network 100 the corresponding first portion 524, the corresponding second portion 525, and the corresponding third portion 535, at 810. The first portion 524 is one or more memory locations from the first subset 522, the second portion 525 is one or more memory locations from the second subset 523, and the third portion 535 is one or more memory locations from the SCM device 530.

The neural network 100 is initialized by assigning each processor 10 to execute one or more neurons 11 from each level 415 of the hierarchical cortical system 500, at 815. For example, a first processor 10 is assigned to be a first neuron 11 from a level k, and a second neuron 11 from a level (k+1), and so on. Further, the SCM device 530 is initialized by storing the initial neuron data for the neurons 11 in the hierarchical cortical system 500, at 820. The neuron data includes connection data and weight data for each neuron 11. The initialization includes storing, at the third portion 535 assigned to the first processor 10, the neuron data for all the neurons 11 that the first processor 10 is assigned from each of the hierarchical levels 415. In one or more examples, the neuron data is stored using a database, a lookup table, or any other data structure that can be accessed using a level number. For example, the third portion 535 assigned to the first processor 10 stores neuron data for the first neuron 11 from the level k, and the neuron data for the second neuron 11 from the level (k+1). Thus, the same first processor 10 executes different neuron operations corresponding to different neurons from different hierarchical levels from the hierarchical cortical system 500.

Upon starting the execution of the hierarchical cortical system 500, the method further includes copying, by the memory controller 510, data from the SCM device 530 to the scratchpad memory device 520, at 825. The neuron data for the current level that is being computed by the processors 10 is loaded from the SCM device 530 to the scratchpad memory device 520 into the corresponding subset based on the level number, for example.

The method further includes starting the compute cycles (see FIG. 7), at 830. The compute cycles are performed for each level, starting with level k=1 until all levels in the hierarchy are processed. A compute cycle k 710 includes the processors 10 performing the computations for the current level, say level k, using the neuron data from the scratchpad memory device 520, at 832. Each processor 10 accesses corresponding neuron data from the assigned memory portion from the scratchpad memory device 520 for performing the computations. Further, the compute cycle k 710 includes, while the processors 10 are computing, in parallel, copying the neuron data for the next level (k+1) from the SCM device 530 into the designated area of the scratchpad memory device 520 by the memory controller, at 834. Further, the compute cycle k 710 includes updating the neuron data in the SCM device 530 for the neurons 11 in which the connection data/weight data is updated by the computations, at 836. The update is performed by updating the third portion 535 of a processor 10 that has updated neuron data. Due to sparsity principle in which only the active neurons (typically 1-2% of all neurons) need to be updated, the number of writes to the SCM device 530 are small (below a predetermined threshold), mitigating endurance issues with the SCM device 530.

Updating the connectivity changes in the SCM device 530 can include creation or removal of a connection, or a change in the data associated with the connection, such as a permanence or strength. This can be a mathematical change such as adding or subtracting a certain value for the changed connections. In one or more examples, the memory controller 510 performs the mathematical operation as the connection is being written into the SCM device 530, freeing up the processors 10 and reducing traffic to the neural network 100.

The method includes performing n compute cycles, in this manner, each compute cycle for a respective hierarchical level, n being the total number of levels in the hierarchical cortical system 500, at 840. Once all levels are processed, the result from the last level is output, at 845.

The method facilitates the hierarchical cortical system 500 to hide higher read latency of the SCM device 530 by the compute cycle of the processors 10. Further, the method facilitates resource virtualization, as the same processor 10 and corresponding assigned memory portions can be used to execute neurons from different levels.

The embodiments of the present invention further facilitate providing pipelining using the hierarchical cortical system 500. Pipelining requires that each processor 10 plays the same role for different incoming data. Less processing is required at the upper levels of the hierarchy because representations and feature maps are more stable and changes are slower in the upper levels of the hierarchy compared to the lower levels.

Figure 9:
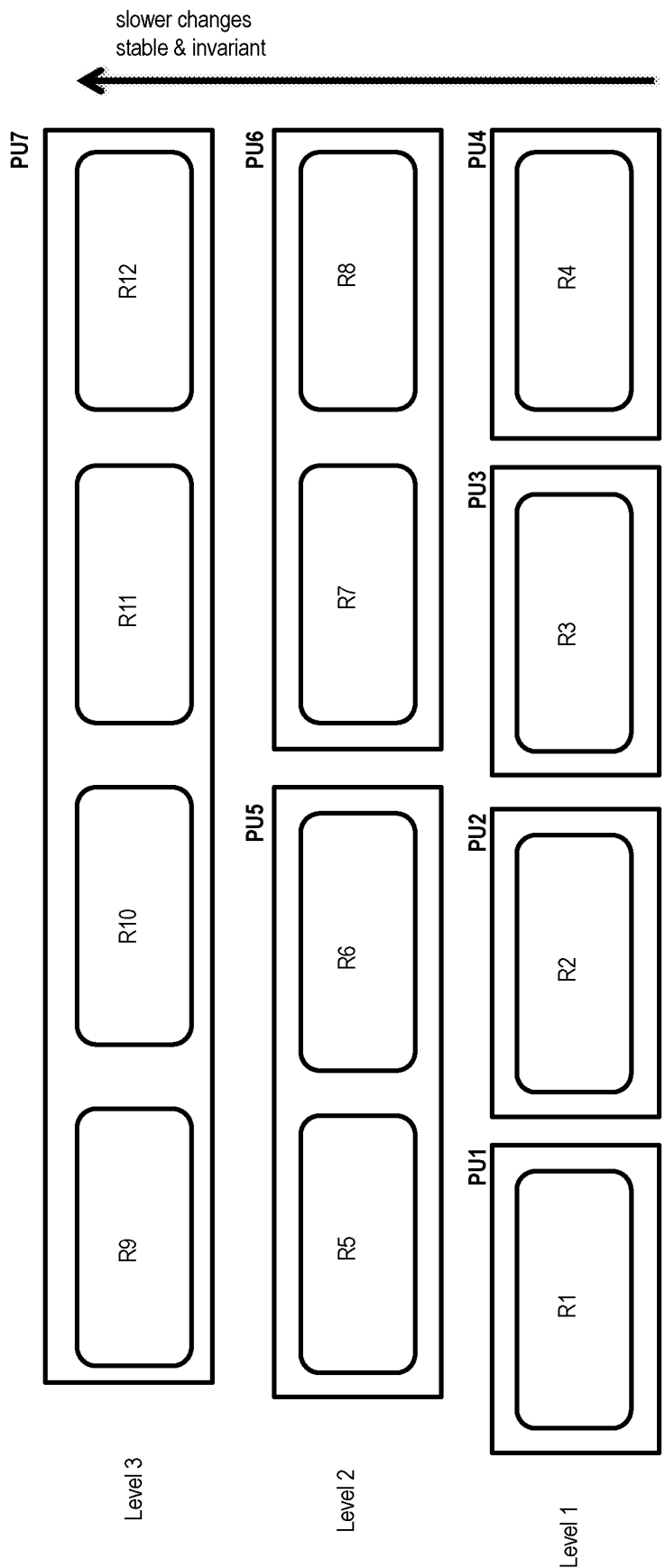
FIG. 9 depicts a block diagram for pipelining the operations of a hierarchical cortical system according to one or more embodiments of the present invention.

FIG. 9 depicts a block diagram for pipelining the operations of the hierarchical cortical system 500 according to one or more embodiments of the present invention. As an example, suppose that processing at Level 2 is twice as fast as at Level 1, and Level 3 is twice as fast as Level 2. Using the method described herein, each neuron 11 (or a set of predetermined number of neurons) in Level 1 can require that its processing is performed by an assigned processor 10, but those in Level 2 could be shared 2× in the same cycle, and those in Level 3 could be shared 4× in the same cycle. This is because as the stability increases and the speed of changes decreases as the higher levels of the hierarchy are being processed, a processor 10 can be assigned to more number of neurons 11 in the higher levels than a number of neurons 11 in the lower levels. For this example, the net savings would be the use of 7 processors 10 (PU1-PU7) instead of 12. Here, PU5 can process both regions R5 and R6 in the time it takes PU1 to process R1; PU7 can process R9, R10, R11, R12 in the same time.

The embodiments of the present invention can be used to perform hierarchical temporal memory (HTM) emulations, or any other type of hierarchical cortical system emulations. In an example scenario the HTM emulations performed in a typical range of 50-200 ms per iteration (level), depending on the number of synapses, which changes as the emulation proceeds. It is understood that the above results are from one example, and that in other example scenarios the results can vary based on the setup, such as depending on frequency, type of processors, type of SCM device, type of scratchpad memory device, and the like.

The embodiments of the present invention accordingly provide a method to enable higher storage of connectivity information in a cortical system using SCM. The embodiments of the present invention also provide a method to hide the read latency penalty of SCM behind the compute cycles in a cortical emulation. Further, the embodiments of the present invention provide a method to mitigate the limited write endurance of SCM by writing back only changes in connectivity at each cycle. Further yet, the embodiments of the present invention provide a method of resource virtualization in a hierarchical cortical system, allowing much lower processing and memory resource requirements for large-scale systems. The embodiments of the present invention also provide a method of near memory processing for connectivity information updates by enabling the memory controller to write updated data into the SCM reducing computation by the processors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A hierarchical cortical emulation system comprising:
   a neural network device comprising a plurality of processors;
   a memory controller communicatively coupled with the neural network device;
   a scratchpad memory device communicatively coupled to the memory controller; and
   a storage class memory device communicatively coupled to the memory controller;
   wherein:
     the scratchpad memory device is partitioned into a first subset of memory locations and a second subset of memory locations;
     a processor, from the plurality of processors of the neural network device, is assigned a first memory portion from the first subset of memory locations, a second memory portion from the second subset of memory locations, and a third memory portion from the storage class memory device; and
     the neural network device and the memory controller perform a compute cycle for a hierarchical level k from the hierarchical cortical emulation system that contains n levels, $1 \leq k \leq n$, wherein the compute cycle comprises:
       performing, by the processor, computations for a neuron from the level k using neuron data for the hierarchical level k stored in the first memory portion; and
       in parallel, copying by the memory controller, the neuron data for a hierarchical level k+1 from the third memory portion to the second memory portion, wherein the first memory portion is used to store the neuron data for odd numbered hierarchical levels and the second memory portion is used to store the neuron data for even numbered hierarchical levels.

2. The system of claim 1, wherein copying the neuron data for level k+1 comprises selecting, from the third memory portion the neuron data for level k+1 from the neuron data for all hierarchical levels.

3. The system of claim 1, wherein performing the compute cycle k further comprises updating the neuron data for one or more neurons from the hierarchical level k in the storage class memory device.

4. The system of claim 3, wherein the memory controller updates the neuron data by performing one or more mathematical computations on the neuron data that is stored in the storage class memory device.

5. The system of claim 1, wherein the neuron from the hierarchical level k is a first neuron, and wherein the neural network device and the memory controller perform a compute cycle k+1 for the hierarchical level k+1 from the hierarchical cortical emulation system, in which the same processor performs computations for a second neuron from the hierarchical level k+1 using the neuron data for the hierarchical level k+1 stored in the second memory portion.

6. The system of claim 1, wherein the processor performs computations for a plurality of neurons from the hierarchical level k.

7. A computer-implemented method comprising:
   partitioning, by a memory controller, a scratchpad memory device into a first subset of memory locations and a second subset of memory locations;
   assigning, by a controller, a processor, from a plurality of processors of a neural network device, a first memory portion from the first subset of memory locations, a second memory portion from the second subset of memory locations, and a third memory portion from a storage class memory device; and
   performing, by the neural network device and the memory controller, a compute cycle k for a hierarchical level k from a hierarchical cortical emulation system that contains n levels, $1 \leq k \leq n$, wherein the compute cycle k comprises:
     performing, by the processor, computations for a neuron from the hierarchical level k using neuron data for the hierarchical level k stored in the first memory portion; and
     in parallel, copying by the memory controller, the neuron data for a hierarchical level k+1 from the third memory portion to the second memory portion, wherein the first memory portion is used to store the neuron data for odd numbered hierarchical levels and the second memory portion is used to store the neuron data for even numbered hierarchical levels.

8. The computer-implemented method of claim 7, wherein copying the neuron data for the hierarchical level k+1 comprises selecting, from the third memory portion the neuron data for the hierarchical level k+1 from the neuron data for all hierarchical levels.

9. The computer-implemented method of claim 7, wherein performing the compute cycle k further comprises updating the neuron data for one or more neurons from the hierarchical level k in the storage class memory device.

10. The computer-implemented method of claim 9, wherein the memory controller updates the neuron data by performing one or more mathematical computations on the neuron data that is stored in the storage class memory device.

11. The computer-implemented method of claim 7, wherein the neuron from the hierarchical level k is a first neuron, and wherein the neural network device and the memory controller perform a compute cycle k+1 for the hierarchical level k+1 from the hierarchical cortical emulation, in which the same processor performs computations for a second neuron from the hierarchical level k+1 using the neuron data for the hierarchical level k+1 stored in the second memory portion.

12. The computer-implemented method of claim 7, wherein the processor performs computations for a plurality of neurons from the hierarchical level k.

13. A computer program product comprising a computer readable storage medium having program instructions embodied therewith, the program instructions executable by a processing circuit to cause the processing circuit to perform a hierarchical cortical emulation comprising:
    partitioning a scratchpad memory device into a first subset of memory locations and a second subset of memory locations;
    assigning a processor, from a plurality of processors of a neural network device, a first memory portion from the first subset of memory locations, a second memory portion from the second subset of memory locations, and a third memory portion from a storage class memory device; and
    performing, by the neural network device and a memory controller, a compute cycle k for a hierarchical level k from a hierarchical cortical emulation that contains n levels, $1 \leq k \leq n$, wherein the compute cycle k comprises:
        performing, by the processor, computations for a neuron from the hierarchical level k using neuron data for the hierarchical level k stored in the first memory portion; and
        in parallel, copying by the memory controller, the neuron data for a hierarchical level k+1 from the third memory portion to the second memory portion, wherein the first memory portion is used to store the neuron data for odd numbered hierarchical levels and the second memory portion is used to store the neuron data for even numbered hierarchical levels.

14. The computer program product of claim 13, wherein copying the neuron data for the hierarchical level k+1 comprises selecting, from the third memory portion the neuron data for the hierarchical level k+1 from the neuron data for all hierarchical levels.

15. The computer program product of claim 13, wherein performing the compute cycle k further comprises updating the neuron data for one or more neurons from the hierarchical level k in the storage class memory device.

16. The computer program product of claim 13, wherein the neuron from the hierarchical level k is a first neuron, and wherein the neural network device and the memory controller perform a compute cycle k+1 for the hierarchical level k+1 from the hierarchical cortical emulation, in which the same processor performs computations for a second neuron from the hierarchical level k+1 using the neuron data for the hierarchical level k+1 stored in the second memory portion.

17. The computer program product of claim 13, wherein the processor performs computations for a plurality of neurons from the hierarchical level k.

\* \* \* \* \*